UNITED STATES PATENT OFFICE.

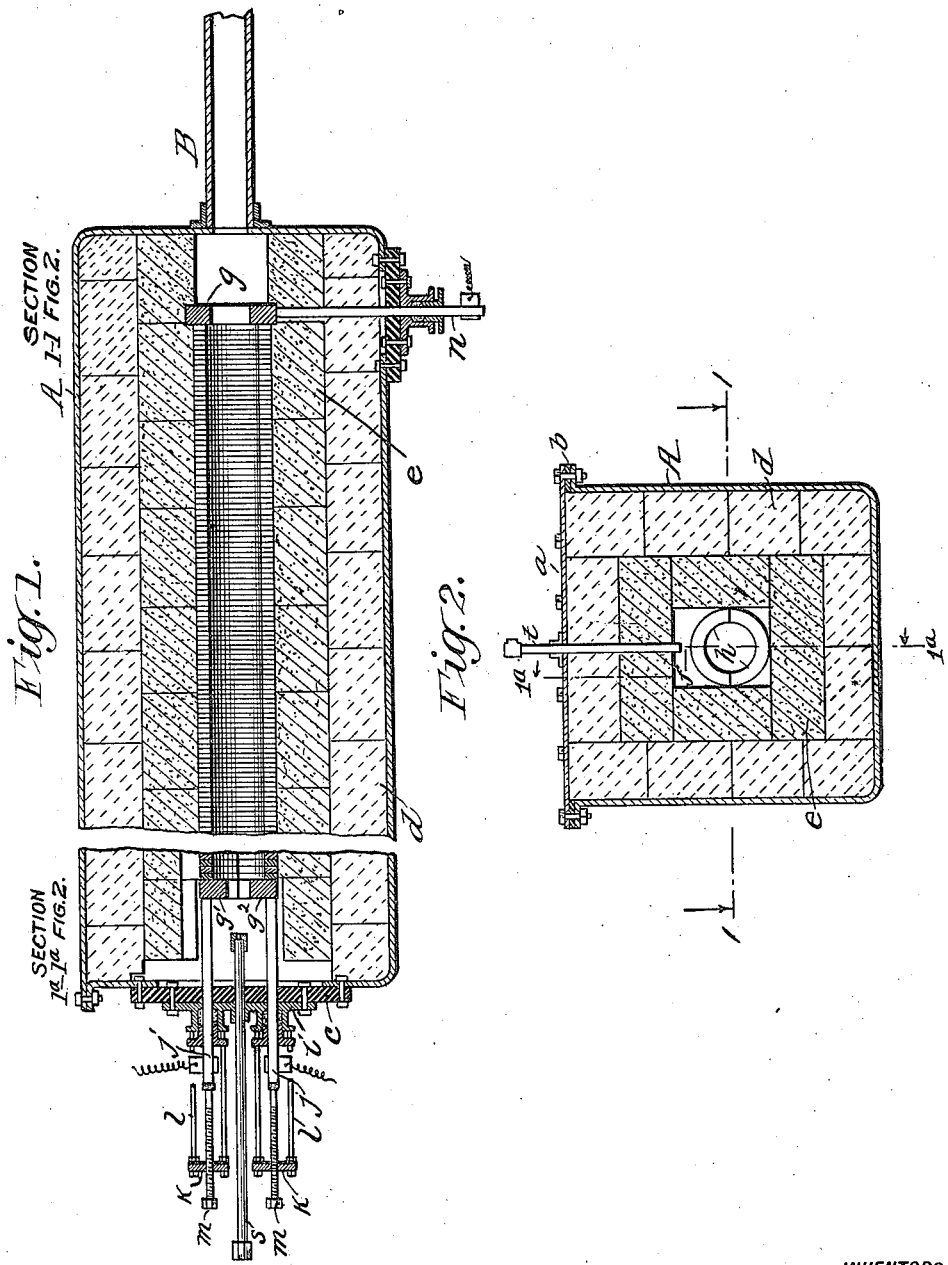

RAYMOND F. BACON, BENJAMIN T. BROOKS, AND HUGH CLARK, OF PITTSBURGH, PENNSYLVANIA, ASSIGNORS TO GULF REFINING COMPANY, OF PITTSBURGH, PENNSYLVANIA, A CORPORATION OF TEXAS.

MANUFACTURE OF CARBON-BLACK AND HYDROGEN.

1,220,391.

Specification of Letters Patent.

Patented Mar. 27, 1917.

Application filed July 9, 1914. Serial No. 849,882.

*To all whom it may concern:*

Be it known that we, RAYMOND F. BACON, BENJAMIN T. BROOKS, and HUGH CLARK, citizens of the United States, all residing in the city of Pittsburgh, county of Allegheny, State of Pennsylvania, have invented certain new and useful Improvements in Manufacture of Carbon-Black and Hydrogen; and we do hereby declare the following to be a full, clear, and exact description of the invention, such as will enable others skilled in the art to which it appertains to make and use the same.

Our invention relates to the obtaining of a highly superior grade of carbon black, and also practically pure hydrogen, by the decomposition of a suitable hydrocarbon into its elemental constituents, the conditions of working being such as to insure a satisfactory yield of both products in a continuous operation. The apparatus employed, in the practice of the invention, is of a character adapted not only to develop and maintain the high temperatures required for the efficient progress of the operation, but to withstand, during long continued use, the exacting requirements imposed upon it.

We have found that unless the carbon black produced as one of the products of the decomposition is promptly removed from the high temperatures (exceeding 1200° C.) of the heating zone in which the decomposition is proceeding, such carbon black will deteriorate in quality for commercial uses, losing its desired deep black luster, and becoming materially duller and grayer. Accordingly, in the practice of our invention, we so conduct the operation that the particles of carbon black will remain suspended within and throughout the hydrogen, and we effect the continuous removal of the particles of carbon black, by withdrawing them simultaneously with the hydrogen from the zone of decomposition. According to our preferred practice, this withdrawal of the particles of carbon black, while suspended within the hydrogen is effected by the pressure developed within the apparatus due to the flashing of the hydrocarbon into its said elemental constituents.

As will hereinafter more fully appear, the apparatus is of such construction and material as to resist the destructive tendencies incident not only to the high temperatures necessarily employed, but also incident to the activity at such high temperatures, of the decomposed constituents of the hydrocarbons. So also, the apparatus is of such a construction as to insure that the hydrogen produced shall not be lost wholly or in part by leakage, and permits conducting it to suitable containers without loss. The apparatus embodies, therefore, a construction wherein the manufacture of carbon black of the highest quality, and substantially pure hydrogen, may be successfully carried out in a practical manner.

In the accompanying drawing, Figure 1 represents a section, the left hand end being a vertical section on the line $1^a$—$1^a$ while the right hand end is a horizontal section on the line 1—1 of an apparatus appropriate to the practice of the invention.

Fig. 2 represents a transverse vertical sectional view thereof.

Similar letters of reference indicate similar parts in both views.

Referring to the drawing, A indicates a gas-tight metal shell or casing, having a gas-tight cover $a$ removably bolted or otherwise secured thereto, as shown, preferably with the interposition of a suitable compressible gasket $b$ of asbestos, or the like. The casing is provided at one end with an exit pipe B for the outflow of the carbon black and hydrogen, and has an opening at its opposite end closed by the removable gas-tight asbestos board closure $c$, which is bolted or otherwise secured to the casing.

Within the casing is contained a lining of fire-brick $d$, and an inner lining of magnesite brick $e$, this compound lining serving to cut down heat radiation from the internal chamber $f$. Within the chamber $f$ is located the heating element employed for decomposing the hydrocarbons into the carbon black and hydrogen constituents desired. This heating element is made up of a double series of graphite rings or annular disks $h$ preferably cut in two diametrically, as shown in Fig. 2. These annular disks abut at one end of the series against the solid graphite block $g$. At the other end of the series, a graphite block $g'$ abuts against the upper row of half rings, and a like graphite block $g^2$ abuts against the lower row of half rings. The asbestos board c is provided with a face plate i bolted thereto, and, through stuffing boxes of the face plate there extend the carbon rods j, each of which is connected to the same terminal of an electric heating circuit. Suitable provision is made for exerting pressure upon the ends of the carbon rods j, so as to force them against the blocks g', g², independently of each other. Suitable pressure means for this purpose may consist of a plate k connected by bolts l to the stuffing box or to any other suitable part of the frame, and a screw-threaded rod m adapted to bear upon the outer free end of the corresponding rod j, with the interposition of insulating material, if desired. Each of the carbon rods j, may, therefore, be acted upon separately by the pressure devices and will transmit the pressure to the corresponding block g', g², so that the duty of keeping the upper row of half disks in contact with each other and the lower row of half disks in contact with each other will be appropriately divided. The block g at the opposite end of the series of disks serves as an abutment to take up the pressure, and is itself connected to the opposite side of the electric heating circuit, by means of a graphite rod n, which likewise passes through a similar asbestos board and stuffing box, and which may also be provided with similar pressure devices (not shown).

The hydrocarbon to be decomposed is preferably supplied as a liquid jet forced in from any suitable source of supply, through the inlet pipe s, said inlet pipe having a nozzle aperture of appropriate dimensions.

In the preferred form of the apparatus shown, the liquid hydrocarbon is injected in a thin stream through the inlet pipe s. It immediately enters the decomposition zone of the apparatus, made up of the annular walls of the series of graphite rings h, which rings are heated by the electric current to a temperature exceeding 1200° C. and sufficient to flash and decompose the hydrocarbon into its chief elementary constituents (carbon black and hydrogen). The temperature of flashing or decomposition, and the quantity of liquid hydrocarbon injected are so calibrated to each other and to the dimensions of the decomposing chamber that the gas pressure developed shall be sufficient to sweep out both of the said products, while the particles of carbon black are still suspended in the hydrogen, and without permitting them to settle in the decomposition zone of the apparatus. The staunch character of the metal casing of the apparatus prevents the loss of hydrogen by leakage and insures its passage from the apparatus without loss. The carbon black is deposited in a suitable settling chamber, or the like, exterior to the apparatus, and the hydrogen is carried on to a suitable gas holder or container, as will be fully understood. The carbon black recovered is of a black silky luster, appropriate to the best commercial uses, and the hydrogen is substantially pure.

It will, of course, be understood that instead of employing hydrocarbons or a mixture of hydrocarbons as the material from which the desired products are to be obtained, any other suitable material containing hydrogen and carbon as its chief elementary constituents may be employed.

A leading characteristic of the invention and one which is of primary importance for its commercial use consists in the durability of the walls of the decomposing zone or heating chamber proper. Ordinary refractory materials are not suitable for the walls of this decomposing zone or heating chamber, and, for this reason, we construct the walls of a material which will not only withstand, without cracking or shrinking, the high degree of heat to which they are subjected, but also of a material which will not react with the hydrocarbon mixture in such a way as to render the walls porous. Thus, we may construct the walls (say the disks h) either of graphite as hereinbefore stated, or of some other form of carbon, or of a mixture thereof with magnesite, carborundum, or similar material, so that the electrical resistance of the tubular chamber may be sufficient to raise it to the desired temperature. We have found that a mixture of 50% of graphite with a composition made up of magnesite, carborundum or similar material gives good results in the construction of a tube three feet long and having the other relative dimensions shown in the drawing. Where the tube is made up of rings, as shown in the drawing, and open at its ends, the function of the outer casing is, of course, to serve as a gas-tight closure to the decomposition chamber, and the metal shell of the casing is protected and insulated from the intense heat of the decomposition chamber by the intervening bodies of refractory material, i. e. the bricks of magnesite, fire clay, chromium oxid, or the like.

The temperature prevailing in the decomposition chamber may be noted in any suitable manner, as, for instance, by a pyrometer indicated at t, in Fig. 2.

What we claim is:—

1. The method of making carbon black and hydrogen simultaneously which consists in exposing a hydrocarbon to a temperature sufficient to flash it into its constituent elements and removing the latter from the flashing zone while the carbon black thus produced is still in suspension in the hydrogen and in such condition that when deposited from the hydrogen it will have a deep black luster.

2. The method of making carbon black and hydrogen simultaneously, which consists in injecting a jet of liquid hydrocarbon into a zone of sufficiently high temperature to flash the hydrocarbon into its elemental constituents, and expelling both constituents continuously by the gas pressure developed, while the carbon black produced is still in suspension in the hydrogen.

In testimony whereof we affix our signatures, in presence of two witnesses.

RAYMOND F. BACON.
BENJAMIN T. BROOKS.
HUGH CLARK.

Witnesses:
E. C. CHANCE,
OUNDRY PURRELL.